United States Patent
Lin

(10) Patent No.: US 7,643,071 B2
(45) Date of Patent: Jan. 5, 2010

(54) DIGITAL ZOOMING APPARATUS AND METHOD

(75) Inventor: Chia-Hsien Lin, Taishan Township, Taipei County (TW)

(73) Assignee: Quanta Computer Inc., Tao Yuan Shien (TW)

( * ) Notice: Subject to any disclaimer, the term of this patent is extended or adjusted under 35 U.S.C. 154(b) by 594 days.

(21) Appl. No.: 11/454,823

(22) Filed: Jun. 15, 2006

(65) Prior Publication Data

US 2007/0013792 A1  Jan. 18, 2007

(30) Foreign Application Priority Data

Jul. 13, 2005  (TW) .............................. 94123706 A

(51) Int. Cl.
*H04N 5/262* (2006.01)

(52) U.S. Cl. ............ 348/240.2; 348/208.6; 348/333.05; 348/333.11

(58) Field of Classification Search ... 348/208.4–208.6, 348/222.1, 231.99, 231.1, 240.99, 240.2, 348/333.01; 382/166, 232

See application file for complete search history.

(56) References Cited

U.S. PATENT DOCUMENTS

| | | | | |
|---|---|---|---|---|
| 7,257,278 B2 * | 8/2007 | Burks et al. | ............... | 348/E3.02 |
| 2003/0197879 A1 * | 10/2003 | Terashita | ................. | 348/207.2 |
| 2004/0165080 A1 * | 8/2004 | Burks et al. | ............... | 348/222.1 |
| 2004/0174492 A1 * | 9/2004 | Scherer | ....................... | 351/142 |
| 2004/0189831 A1 * | 9/2004 | Shibatani et al. | ........ | 348/240.99 |

FOREIGN PATENT DOCUMENTS

JP  2004-88510  8/2002

\* cited by examiner

*Primary Examiner*—Lin Ye
*Assistant Examiner*—Gevell Selby
(74) *Attorney, Agent, or Firm*—Stites & Harbison PLLC; Juan Carlos A. Marquez, Esq.

(57) ABSTRACT

This invention discloses a digital zooming apparatus for adjusting the size of a sensed image sensed by a sensor. The digital zooming apparatus includes an adjusting module, a first image-processing module, a storage module and a second image-processing module. The adjusting module connected to the sensor receives the sensed image and adjusts the sensed image according to a zooming factor to produce an adjusted image. The first image-processing module connected to the adjusting module processes the adjusted image according to a first predetermined condition and a second predetermined condition to produce a first image. The storage module connected to the first image-processing module stores the first image. The second image-processing module connected to the storage module receives the first image and processes the first image according to the second predetermined condition to produce a second image.

18 Claims, 3 Drawing Sheets

DIGITAL ZOOMING APPARATUS AND METHOD

BACKGROUND OF THE INVENTION

1. Field of the Invention

This present invention relates to a digital zooming apparatus. More specifically, this invention is related to a digital zooming apparatus for adjusting the size of a sensed image sensed by a sensor.

2. Description of the Prior Art

No matter in digital or traditional cameras, an optical viewfinder is generally used for capturing an image relative to the real scene and for providing the captured image as a reference to users. The image captured by an optical viewfinder enables users to know more accurately what scene is going to be taken as photos. To adjust the range of scenes to be taken, most cameras has zooming functions. Some digital cameras have optical and digital zooming functions at the same time.

Optical zooming is adjusting a zoom lens manually or mechanically. Manually zooming is moving the zoom lens by a user's hands. Mechanically zooming is expanding or contracting the zoom lens with a driving device, for instance, a motor. Both manually and mechanically zooming adjusts the focal length of cameras via changing the position of a zoom lens.

Generally speaking, digital zooming in digital cameras is performed by first temporarily storing an image sensed by a sensor in a memory space. The sensed image is then resized by an image processing unit. When designing the hardware of a digital zooming apparatus, the storage capacity of a memory has to be considered. If the designer wants to completely store the sensed image into the memory at a time, the storage capacity of the memory then has to be large enough and the cost is high. On the contrary, if the memory is designed to have a smaller storage capacity, the sensed image must be partially stored in to the memory for several times. The image processing unit then synchronously resizes the part of the sensed image stored in the memory. If the efficiency of the image processing unit is lower than the speed of storing the sensed image into the memory, some image data might be lost.

Accordingly, one object of this invention is providing a digital zooming apparatus to overcome the aforementioned problems.

SUMMARY OF THE INVENTION

The digital zooming apparatus according to this invention can adjust the size of a sensed image sensed by a sensor based on the zooming factor set by users, the preset size of an output image, and the maximum storage capacity of a storage module.

One preferred embodiment according to this invention is a digital zooming apparatus used for adjusting the size of a sensed image sensed by a sensor. The digital zooming apparatus includes an adjusting module, a first image-processing module, a storage module, and a second image-processing module. The adjusting module is connected to the sensor. After receiving the sensed image from the sensor, the adjusting module adjusts the sensed image according to a zooming factor to produce an adjusted image. The first image-processing module is connected to the adjusting module and used for processing the adjusted image based on a first predetermined condition and a second predetermined condition to produce a first image. The storage module is connected to the first image-processing module and used for storing the first image. The second image-processing module is connected to the storage module. After receiving the first image, the second image-processing module processes the first image according to the second predetermined condition to produce a second image.

According to this invention, before storing images into the storage module, the maximum storage capacity of the storage module and the preset size of the second image are both considered. In this way, memory spaces needed for a digital zooming apparatus are reduced and the disadvantages of the prior arts are prevented. The digital zooming apparatus according to this invention can effectively reduce the needs for memory spaces and solve the problem of losing image data. Thus, costs in hardware for a digital zooming apparatus can be lower than the prior arts.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
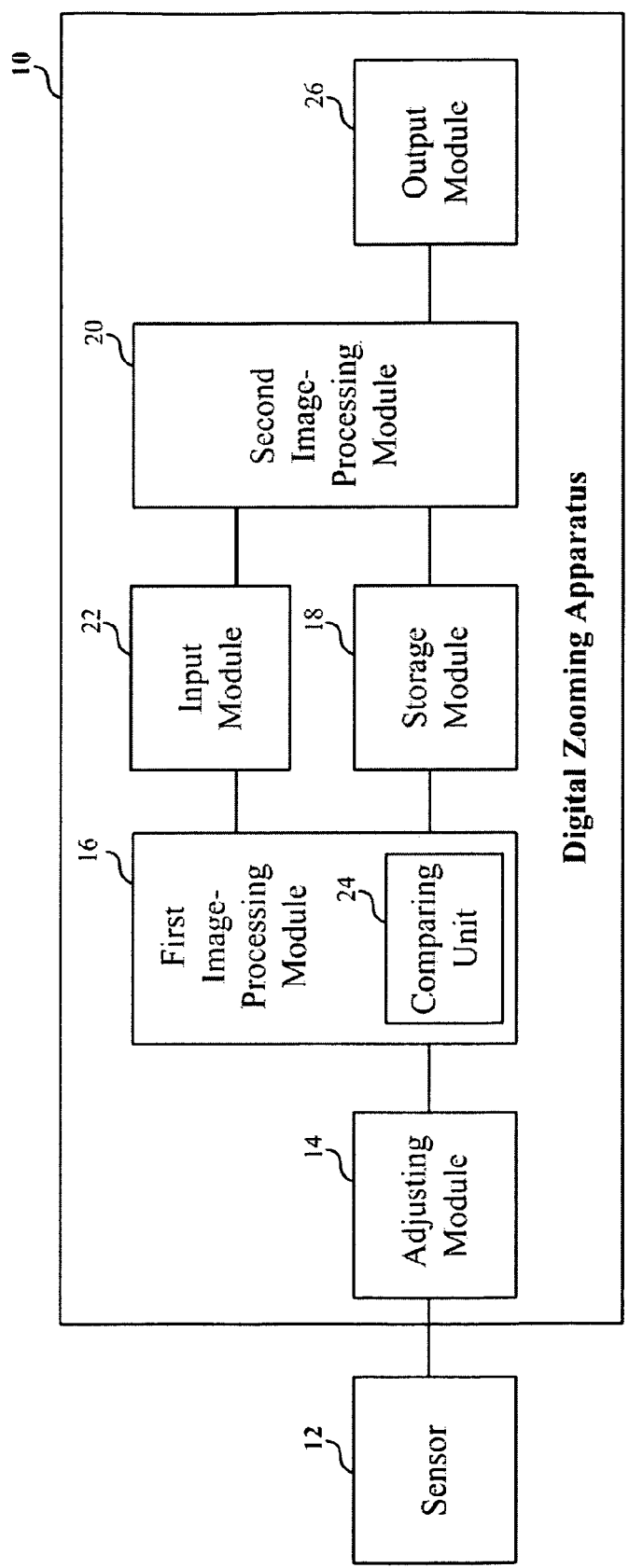
FIG. 1 is the block diagram of the digital zooming apparatus 10 according to one embodiment of this invention.

Referring to FIG. 1, the block diagram of the digital zooming apparatus 10 according to one embodiment of this invention is illustrated. The digital zooming apparatus 10 is used for adjusting the size of a sensed image sensed by the sensor 12. The digital zooming apparatus 10 includes an adjusting module 14, a first image-processing module 16, a storage module 18, and a second image-processing module 20.

The adjusting module 14 is connected to the sensor 12. After receiving the sensed image from the sensor 12, the adjusting module 14 adjusts the sensed image according to a zooming factor to produce an adjusted image.

The first image-processing module 16 is connected to the adjusting module 14. The first image-processing module 16 is used for processing the adjusted image produced by the adjusting module 14 based on a first predetermined condition and a second predetermined condition to produce a first image. In actual applications, the first predetermined condition can be a maximum storage capacity of the storage module 18 and the second predetermined condition can be a preset size of the second image for output.

The first image-processing module 16 includes a comparing unit 24 for comparing the first predetermined condition and the second predetermined condition. When the first predetermined condition is larger than or equal to the second predetermined condition, the first image-processing module 16 processes the adjusted image according to the second predetermined condition to produce the first image. Otherwise, the first image-processing module 16 processes the adjusted image according to the first predetermined condition to produce the first image. For example, if the maximum storage capacity of the storage module 18 is larger than the preset size of the second image, the first image-processing module 16 processes the adjusted image according to the preset size of the second image for output. On the contrary, if the maximum storage capacity of the storage module 18 is smaller than the preset size of the second image, the first image-processing module 16 processes the adjusted image according to the maximum storage capacity of the storage module 18.

The storage module 18 is connected to the first image-processing module 16 and used for storing the first image. The second image-processing module 20 is connected to the storage module 18. After receiving the first image from the storage module 18, the second image-processing module 20 then processes the first image according to the second predetermined condition to produce a second image.

In actual applications, the digital zooming apparatus 10 can further include an output module 26 connected to the second image-processing module 20 for outputting the second image.

The digital zooming apparatus 10 can also include an input module 22 connected to the first image-processing module 16 and the second image-processing module 20. The input module 22 is used for receiving the zooming factor and the second predetermined condition.

In another embodiment, the digital zooming apparatus 10 further includes a selecting module (not shown in FIG. 1). The selecting module is connected to the first image-processing module 16 and the second image-processing module 20. A plurality of preset zooming factors and a plurality of preset conditions are previously stored in the selecting module. The selecting module providing the plurality of preset zooming factors for a user to select said zooming factor and providing the plurality of preset conditions for the user to select said second predetermined condition.

In the following description, an example of how the digital zooming apparatus 10 adjusts the size of a sensed image sensed by the sensor 12 is explained. Assume the maximum storage capacity of the storage module 18 is 800 pixels*600 pixels, the size of the sensed image is 1600 pixels*1200 pixels, a user sets the zooming factor as 4/3, and the preset size of the second image is 1280 pixels*960 pixels. The maximum storage capacity of the storage module is less than the preset size of the second image for output. According to this invention, the adjusting module 14 first takes the central part of the sensed image as an adjusted image, wherein the width and length of the adjusted image are respectively the width and length of the sensed image. That is to say, the size of the adjusted image is 1200 pixels*900 pixels. Thereafter, the first image-processing module 16 resizes the adjusted image to 800 pixels*600 pixels to produce a first image. The first image with the size of 800 pixels*600 pixels is then stored into the storage module 18. The size of the first image is just equal to the maximum storage capacity of the storage module 18. When the first image is requested to be outputted, the second image-processing module 20 first resizes the first image to 1280 pixels*960 pixels to produce a second image. Thus, the size of the second image is equal to the preset size determined by the user.

There is another example. Assume the maximum storage capacity of the storage module 18 is 800 pixels*600 pixels, the size of the sensed image is 1600 pixels*1200 pixels, a user sets the zooming factor as 4/3, and the preset size of the second image is 640 pixels*480 pixels. The maximum storage capacity of the storage module is larger than the preset size of the second image for output. According to this invention, the adjusting module 14 also takes the central part of the sensed image as an adjusted image, wherein the width and length of the adjusted image are respectively the width and length of the sensed image. That is to say, the size of the adjusted image is 1200 pixels*900 pixels. Thereafter, the first image-processing module 16 directly resizes the adjusted image to 640 pixels*480 pixels to produce a first image and stores the first image into the storage module 18. When the first image is requested to be outputted, the second image-processing module 20 directly outputs the first image as the second image. As well, the size of the second image is equal to the preset size determined by the user.

Figure 2:
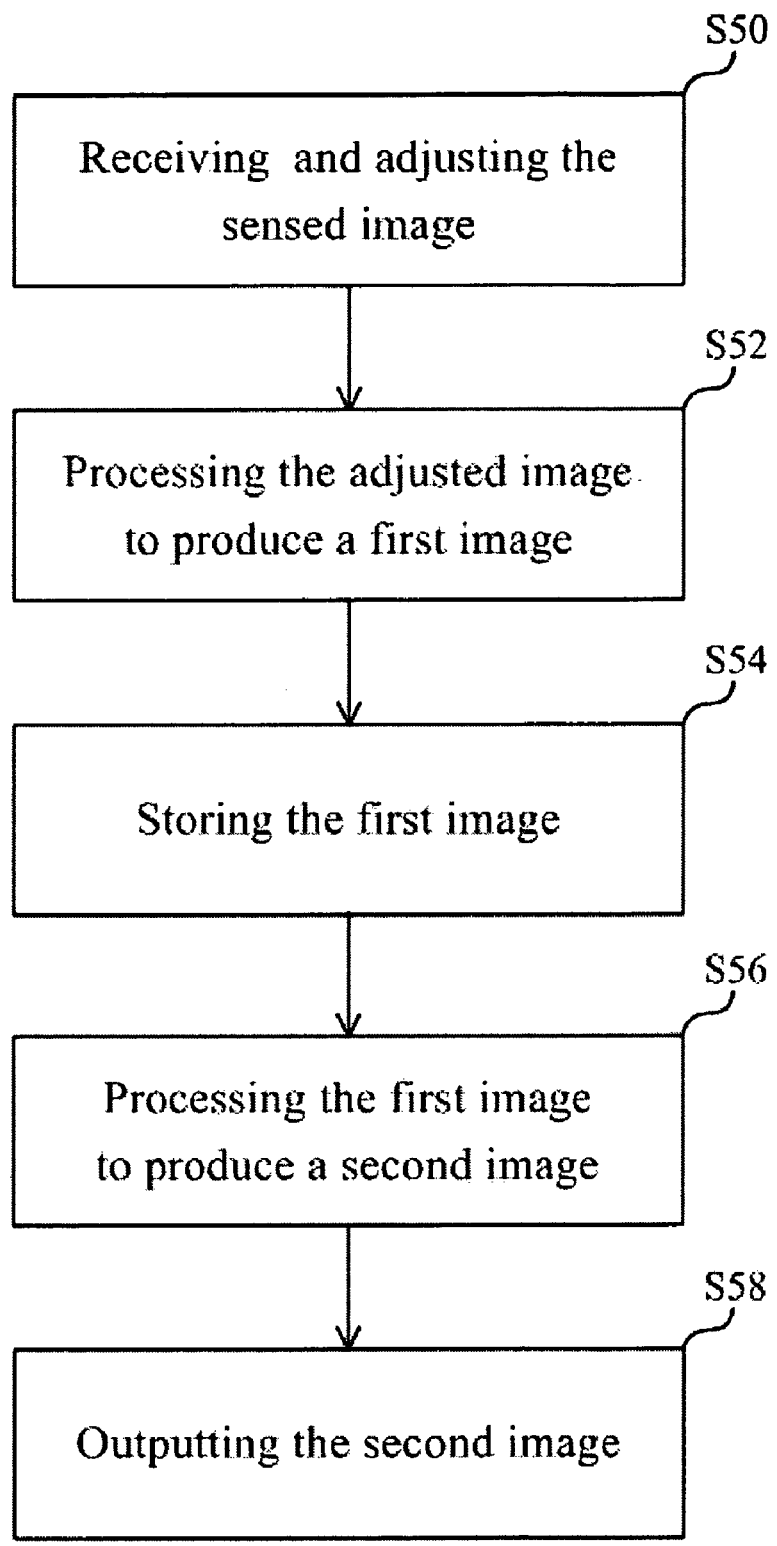
FIG. 2 is the flow chart of the digital zooming method according to one embodiment of this invention.

Referring to FIG. 2, the flow chart of the digital zooming method according to one embodiment of this invention is illustrated. The method is for adjusting the size of a sensed image sensed by a sensor. Step S50 is receiving the sensed image and adjusting the sensed image according to a zooming factor to produce an adjusted image. Step S52 is processing the adjusted image based on a first predetermined condition and a second predetermined condition to produce a first image. Step S54 is storing the first image. Step S56 is processing the first image according to the second predetermined condition to produce a second image for output. Step S58 is outputting the second image.

As described above, the first predetermined condition can be a maximum storage capacity of the storage module 18 and the second predetermined condition can be a preset size of the second image. In some applications, the zooming factor can be selected from a plurality of preset zooming factors; the second predetermined condition can be selected from a plurality of preset conditions. In the other applications, the zooming factor and the second predetermined condition can be inputted by users.

Figure 3:
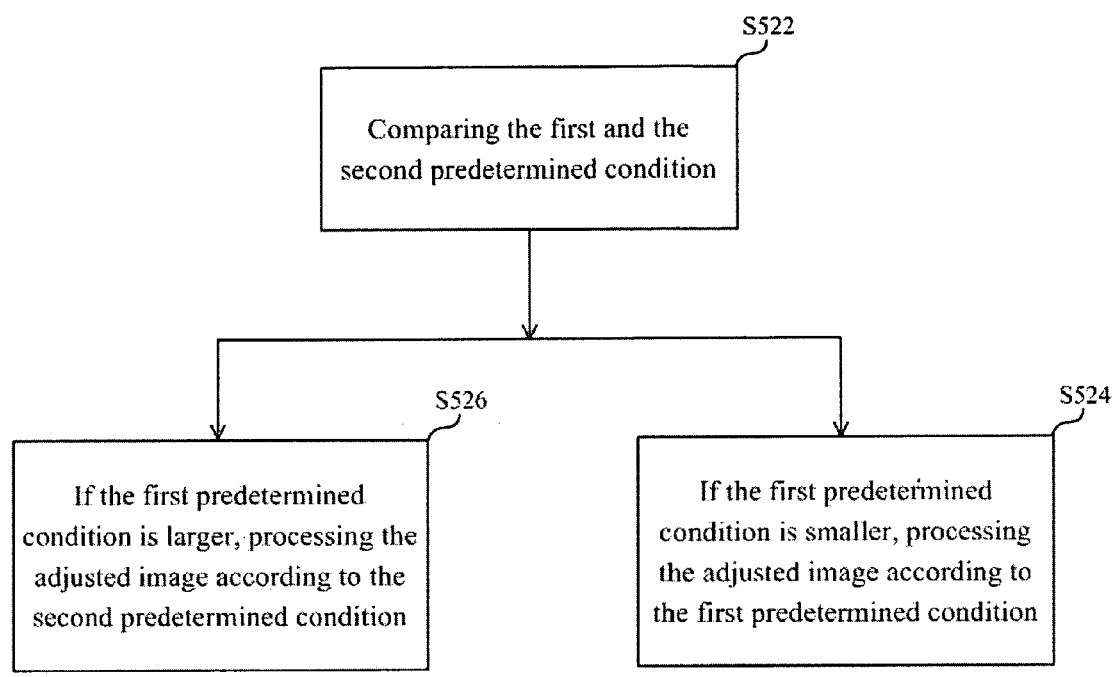
FIG. 3 illustrates the sub-steps included in Step S52 of FIG. 2.

Referring to FIG. 3, sub-steps included in Step S52 are illustrated. Step S522 is comparing the first predetermined condition and the second predetermined condition. Step S524 is processing the adjusted image according to the second predetermined condition to produce the first image when the first predetermined condition is larger than or equal to the second predetermined condition. Step S526 is processing the adjusted image according to the first predetermined condition to produce the first image when the first predetermined condition is smaller than the second predetermined condition.

Although the digital zooming apparatus and method according to this invention might induce aliasing effects in images, better zooming algorithm (for example, algorithm with better low-pass filtering function) can diminish the aliasing effects. With aforementioned apparatus and method, this invention can balance the request of image qualities and cost of memories. In a practical embodiment, under an acceptable image quality, the size of the storage module can be one fourth that of the prior arts. According to this invention, before storing images into the storage module, the maximum storage capacity of the storage module and the preset size of the second image are both considered. In this way, memory spaces needed for a digital zooming apparatus are reduced and the risks of losing image data in prior arts are prevented. Furthermore, this invention can also provide an acceptable image quality. When the available storage capacity is not enough, this invention can also provide a practicable solution.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A digital zooming apparatus for adjusting the size of a sensed image sensed by a sensor, comprising:
   an adjusting module connected to the sensor, the adjusting module receiving the sensed image and adjusting the sensed image according to a zooming factor to produce an adjusted image;

a first image-processing module connected to the adjusting module, the first image-processing module processing the adjusted image based on a first predetermined condition and a second predetermined condition to produce a first image;

a storage module connected to the first image-processing module and used for storing the first image; and a second image-processing module connected to the storage module, the second image-processing module receiving the first image and processing the first image according to the second predetermined condition to produce a second image;

wherein the first predetermined condition is a maximum storage capacity of the storage module.

2. The digital zooming apparatus of claim 1, wherein the second predetermined condition is a preset size of the second image.

3. The digital zooming apparatus of claim 1, wherein the first image-processing module further comprises a comparing unit for comparing the first predetermined condition and the second predetermined condition, when the first predetermined condition is larger than or equal to the second predetermined condition, the first image-processing module processes the adjusted image according to the second predetermined condition to produce the first image, and when the first predetermined condition is smaller than the second predetermined condition, the first image-processing module processes the adjusted image according to the first predetermined condition to produce the first image.

4. The digital zooming apparatus of claim 1, said apparatus further comprising:
an input module connected to the first image-processing module and the second image-processing module, the input module being used for receiving the zooming factor and the second predetermined condition.

5. The digital zooming apparatus of claim 1, said apparatus further comprising:
a selecting module connected to the first image-processing module and the second image-processing module, a plurality of preset zooming factors and a plurality of preset conditions being previously stored in the selecting module, the selecting module providing the plurality of preset zooming factors for an user to select said zooming factor and providing the plurality of preset conditions for the user to select said second predetermined condition.

6. The digital zooming apparatus of claim 1, said apparatus further comprising:
an output module connected to the second image-processing module and being used for outputting the second image.

7. A digital zooming method for adjusting the size of a sensed image sensed by a sensor, comprising the steps of:
(a) receiving the sensed image and adjusting the sensed image according to a zooming factor to produce an adjusted image;
(b) processing the adjusted image based on a first predetermined condition and a second predetermined condition to produce a first image;
(c) storing the first image; and
(d) processing the first image according to the second predetermined condition to produce a second image;
wherein the first predetermined condition is a maximum storage capacity of a storage module.

8. The digital zooming method of claim 7, wherein the second predetermined condition is a preset size of the second image.

9. The digital zooming method of claim 7, said method further comprising the step of:
selecting said zooming factor from a plurality of preset zooming factors and selecting said second predetermined condition from a plurality of preset conditions.

10. The digital zooming method of claim 7, wherein step (b) further comprises the steps of:
(b1) comparing the first predetermined condition and the second predetermined condition;
(b2) when the first predetermined condition is larger than or equal to the second predetermined condition, processing the adjusted image according to the second predetermined condition to produce the first image; and
(b3) when the first predetermined condition is smaller than the second predetermined condition, processing the adjusted image according to the first predetermined condition to produce the first image.

11. The digital zooming method of claim 7, said method further comprising the step of:
inputting the zooming factor and the second predetermined condition.

12. The digital zooming method of claim 7, said method further comprising the step of:
outputting the second image.

13. A digital zooming apparatus for adjusting the size of a sensed image sensed by a sensor, comprising:
an adjusting module connected to the sensor, the adjusting module receiving the sensed image and adjusting the sensed image according to a zooming factor to produce an adjusted image;
a first image-processing module connected to the adjusting module, the first image-processing module processing the adjusted image based on a first predetermined condition and a second predetermined condition to produce a first image;
a storage module connected to the first image-processing module and used for storing the first image; and
a second image-processing module connected to the storage module, the second image-processing module receiving the first image and processing the first image according to the second predetermined condition to produce a second image;
wherein the second predetermined condition is a preset size of the second image.

14. The digital zooming apparatus of claim 13, wherein the first image-processing module further comprises a comparing unit for comparing the first predetermined condition and the second predetermined condition, when the first predetermined condition is larger than or equal to the second predetermined condition, the first image-processing module processes the adjusted image according to the second predetermined condition to produce the first image, and when the first predetermined condition is smaller than the second predetermined condition, the first image-processing module processes the adjusted image according to the first predetermined condition to produce the first image.

15. A digital zooming apparatus for adjusting the size of a sensed image sensed by a sensor, comprising:
an adjusting module connected to the sensor, the adjusting module receiving the sensed image and adjusting the sensed image according to a zooming factor to produce an adjusted image;
a first image-processing module connected to the adjusting module, the first image-processing module processing the adjusted image based on a first predetermined condition and a second predetermined condition to produce a first image;

a storage module connected to the first image-processing module and used for storing the first image; and a second image-processing module connected to the storage module, the second image-processing module receiving the first image and processing the first image according to the second predetermined condition to produce a second image;

wherein the first image-processing module further comprises a comparing unit for comparing the first predetermined condition and the second predetermined condition, when the first predetermined condition is larger than or equal to the second predetermined condition, the first image-processing module processes the adjusted image according to the second predetermined condition to produce the first image, and when the first predetermined condition is smaller than the second predetermined condition, the first image-processing module processes the adjusted image according to the first predetermined condition to produce the first image.

16. A digital zooming method for adjusting the size of a sensed image sensed by a sensor, comprising the steps of:
   (a) receiving the sensed image and adjusting the sensed image according to a zooming factor to produce an adjusted image;
   (b) processing the adjusted image based on a first predetermined condition and a second predetermined condition to produce a first image;
   (c) storing the first image; and
   (d) processing the first image according to the second predetermined condition to produce a second image;
   wherein the second predetermined condition is a preset size of the second image.

17. The digital zooming method of claim 16, wherein step (b) further comprises the steps of:

(b1) comparing the first predetermined condition and the second predetermined condition;
   (b2) when the first predetermined condition is larger than or equal to the second predetermined condition, processing the adjusted image according to the second predetermined condition to produce the first image; and
   (b3) when the first predetermined condition is smaller than the second predetermined condition, processing the adjusted image according to the first predetermined condition to produce the first image.

18. A digital zooming method for adjusting the size of a sensed image sensed by a sensor, comprising the steps of:
   (a) receiving the sensed image and adjusting the sensed image according to a zooming factor to produce an adjusted image;
   (b) processing the adjusted image based on a first predetermined condition and a second predetermined condition to produce a first image;
   (c) storing the first image; and
   (d) processing the first image according to the second predetermined condition to produce a second image;
   wherein step (b) further comprises the steps of:
   (b1) comparing the first predetermined condition and the second predetermined condition;
   (b2) when the first predetermined condition is larger than or equal to the second predetermined condition, processing the adjusted image according to the second predetermined condition to produce the first image; and
   (b3) when the first predetermined condition is smaller than the second predetermined condition, processing the adjusted image according to the first predetermined condition to produce the first image.

* * * * *

UNITED STATES PATENT AND TRADEMARK OFFICE
CERTIFICATE OF CORRECTION

PATENT NO.        : 7,643,071 B2                                          Page 1 of 1
APPLICATION NO.   : 11/454823
DATED             : January 5, 2010
INVENTOR(S)       : Chia-Hsien Lin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 798 days.

Signed and Sealed this

Sixteenth Day of November, 2010

David J. Kappos
*Director of the United States Patent and Trademark Office*